Aug. 5, 1930.                H. R. GIBBONS ET AL                1,772,346
ANTIFRICTION BEARING
Filed July 29, 1926
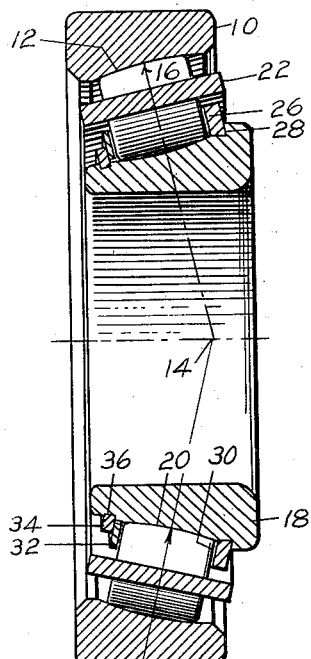
FIG. 1.
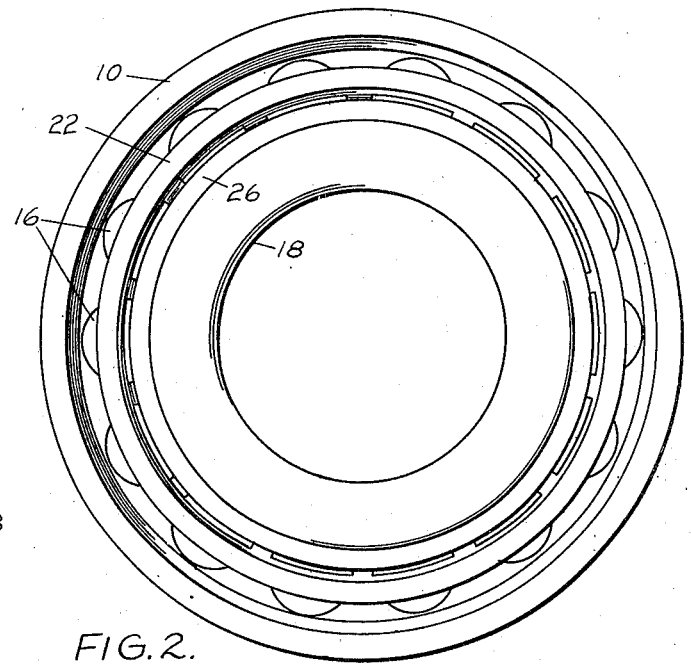
FIG. 2.
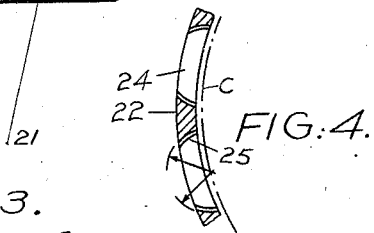
FIG. 4.
FIG. 5.
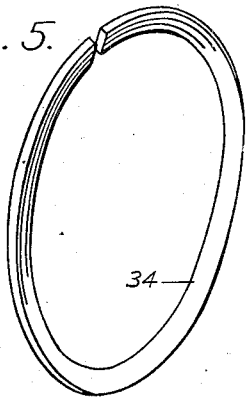
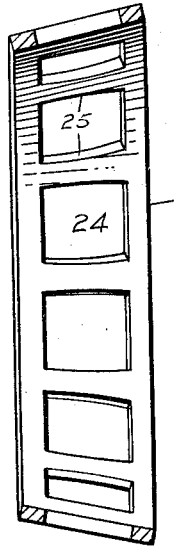
FIG. 3.
FIG. 6.
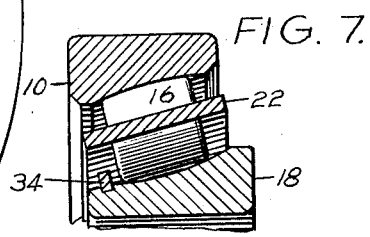
FIG. 7.
INVENTORS:
REGINALD E. WELLS,
HAROLD R. GIBBONS,
BY
THEIR ATTORNEY.

Patented Aug. 5, 1930

1,772,346

UNITED STATES PATENT OFFICE

HAROLD R. GIBBONS, OF CHATHAM, AND REGINALD E. WELLS, OF EAST ORANGE, NEW JERSEY, ASSIGNORS TO GENERAL MOTORS CORPORATION, OF DETROIT, MICHIGAN, A CORPORATION OF DELAWARE

ANTIFRICTION BEARING

Application filed July 29, 1926. Serial No. 125,689.

This invention relates to antifriction bearings and is herein shown, by way of example, as embodied in a single row, angular contact roller bearing of the self aligning type.

Objects of the invention are to improve generally upon bearings of this character and to provide a simple bearing that is easy to manufacture, assemble and adjust and that is capable of efficiently taking radial and thrust loads even under conditions of misalignment.

In the drawings,

Figure 1 is a central transverse section.

Figure 2 is a side elevation.

Figure 3 is a transverse section of the separator band.

Figure 4 is a section of a portion of the separator band.

Figures 5 and 6 are perspective views of certain details, and

Figure 7 is a central transverse section of a modification.

An outer race ring 10 has a spherical raceway 12 the center of curvature being at a point 14 located in the axis of the bearing at one side of the transverse center of the bearing. An inner race ring 18 has a concave raceway 20 whose center of transverse curvature at any given cross section lies outside of the bearing as at a point 21. The raceway 20 may also be considered as generated by a tilted arc revolved about the axis of the bearing. Between the outer and inner concave raceways is mounted a circular series of symmetrical convex rollers 16 whose maximum diameter is midway of their length. The outer raceway 12, inner raceway 20, and rollers 16 all have substantially the same radius of transverse curvature and their centers of transverse curvature all lie on a straight line, such as line 14—21, projected from the point 14 through the maximum diameter of a roller. The angle between this straight line and a plane perpendicular to the axis of the bearing represents the angle of contact of the bearing.

The rollers have substantially line contact with the raceways but, particularly on the outer raceway, it is important to make sure that any departure from full line contact should be such as not to localize the load near the ends of the rollers. In other words the radius of curvature of the rollers should be equal to or a little less than that of the raceways; although not necessary, it is preferable to have the center of transverse curvature of the inner raceway and of the outer raceway lie in a plane at one end of the respective race ring, as this permits the grinding of two outer race rings or two inner race rings at one setting. The rollers 16 are uniformly spaced, held in proper alignment with relation to one another, and retained on the inner race ring by means of a frusto-conical separator band 22 which encircles the rollers between the circle C through their axes and the outer raceway. The separator band has openings 25 smaller than the roller diameter and the rollers fit into the openings with a slight clearance which is insufficient to allow them to slip endwise over the larger end of the inner race ring even in the absence of an end abutment on the inner race ring. For aid in assembly, the bearing shown in Fig. 1 has a dished washer 26 pressed into the inner race ring against a shoulder 28 there being a clearance at 30 between the rollers and the washer when the bearing is in use. When assembling the outer race, however, the washer prevents any undue endwise movement of the rollers and the outer race ring will go on by simple axial movement without whirling the outer race as it is pushed on. The rollers are prevented from coming off the smaller end of the inner ring by a dished washer 32 spaced a little from the rollers and held by a spring ring 34 snapped into a groove 36. The washer 32 may be omitted as it is not intended to contact with the rollers when the bearing is in use, the rollers, due to the extension of the inner raceway beyond their ends, being free for limited axial movement with respect to their races to find their proper paths of travel. The washer 32, or ring 34, holds the rollers, separator and inner race ring assembled for handling as a unit. In both Figs. 1 and 7, all the material of the inner race ring lies inside of the surface of revolution formed by the raceway 20. Thus there are no integral race projections to interfere with grinding of the inner raceway as by an oscillating grinding machine. When there are no such projecting thrust shoulders for the ends of the rollers to rub against, there is less friction and the race ring can be made of thinner stock. Conical rollers and races require thrust shoulders to resist end thrust but the above described relation of races and rollers makes the rollers find their own running positions under load with their end face free. In Fig. 7 the washers 26 and 32 are omitted but the split ring 34 holds the rollers and separator band on the inner race during handling. In this form, the act of assembling the outer race ring may tend to move the rollers endwise but the bearing can be readily assembled, without producing such tendency by whirling the outer race ring concurrently with axial pressure.

We claim:

1. In a single-row self-aligning bearing for thrust and radial load, an outer race ring having an angular contact raceway curved spherically about a center at the axis of the bearing and at one side of the transverse center, a circular series of symmetrical convex rollers having maximum diameter midway of their length and having substantially the same transverse radius of curvature as the outer raceway and contacting with the outer raceway by substantially line contact, a frusto-conical separator band having openings for the rollers, an inner race ring having an angular contact raceway transversely curved to conform to the rollers with substantially line contact, said inner raceway being longer than the rollers, a washer pressed on the larger end of the inner race ring at a point beyond the ends of the rollers, a washer on the smaller end of the inner race ring at a point beyond the other ends of the rollers, means at the smaller end of the inner race ring for holding said last washer, the aforesaid arrangement of race and roller curvatures causing the rollers to automatically take an angular load sustaining position between the washers and out of contact therewith, and the washer at the larger end of the inner race ring limiting endwise climbing movement of the rollers along the inner raceway when the outer race ring is pushed endwise over the rollers in assembling and mounting the bearing; substantially as described.

2. In a single-row, self-aligning bearing for thrust and radial load, an outer race ring having an angular contact raceway curved spherically about a center at the axis of the bearing and at one side of the transverse center, a circular series of symmetrical convex rollers having maximum diameter midway of their length and having substantially the same transverse radius of curvature as the outer raceway and contacting with the outer raceway by substantially line contact, an inner race ring having an angular contact raceway transversely curved to conform to the rollers with substantially line contact, said inner raceway being extended beyond the ends of the rollers, a dished washer fixed on the larger end of the inner race ring at a point beyond the ends of the rollers when the rollers are running under load, the aforesaid arrangement of race and roller curvatures causing the rollers to automatically take an angular contact load sustaining position wherein the ends of the rollers are spaced away from the washer, and the washer limiting endwise climbing movement of the rollers along the inner raceway when the outer race ring is pushed endwise over the rollers in assembling and mounting the bearing; substantially as described.

3. In a single-row, self-aligning bearing for thrust and radial load, an outer race ring having an angular contact raceway curved spherically about a center at the axis of the bearing and at one side of the transverse center, a circular series of symmetrical convex rollers having maximum diameter midway of their length and having substantially the same transverse radius of curvature as the outer raceway and contacting with the outer raceway by substantially line contact, an inner race ring having an angular contact raceway transversely curved to conform to the rollers with substantially line contact, said inner race ring being extended beyond the ends of the rollers, and an abutment on the end of the inner race ring at a point beyond the ends of the rollers when the rollers are running under load, the aforesaid arrangement of race and roller curvatures causing the rollers to automatically take an angular contact load sustaining position wherein the ends of the rollers are spaced away from the abutment; substantially as described.

4. In a single-row, self-aligning roller bearing for thrust and radial load, an outer race ring having an angular contact raceway curved spherically about a center at the axis of the bearing and at one side of the transverse center, a circular series of convex rollers contacting with the outer raceway, an inner race ring having an angular contact raceway longer than the rollers, an abutment fixed on the larger end of the inner race ring at a point beyond the ends of the rollers when the rollers are running under load, the arrangement of race and roller curvatures causing the rollers to automatically take an angular contact load sustaining position wherein the ends of the rollers are spaced away from the abutment, and the abutment limiting endwise climbing movement of the rollers along the inner raceway when the outer race ring is pushed endwise over the rollers in assembling and mounting the bearing; substantially as described.

5. In a single row, self-aligning roller bearing for thrust and radial load, an outer race ring having an angular contact raceway curved spherically about a center at the axis of the bearing and at one side of the transverse center, a circular series of convex rollers having maximum diameter midway of their length and having substantially the same transverse radius of curvature as the outer raceway and contacting with the outer raceway with substantially line contact, an inner race ring having an angular contact raceway transversely curved to conform to the rollers with substantially line contact, a separator for confining the rollers on the inner race ring, a retaining ring mounted near the smaller end of the inner race ring in spaced relation to the ends of the rollers when the rollers are in load sustaining position but serving to hold the rollers, separator and inner race ring in unit-handling assembled relation, the curved inner raceway being extended beyond both ends of the rollers in running position and all of the material of the inner race ring being included inside of the transverse curvature of the inner raceway to enable the rollers to adjust themselves to an angular contact load sustaining position wherein the ends of the rollers are out of rubbing contact with the retaining ring at one end and free from rubbing contact with race projections at the other end; substantially as described.

In testimony whereof we hereunto affix our signatures.

REGINALD E. WELLS.
HAROLD R. GIBBONS.